United States Patent [19]

Casali

[11] Patent Number: 4,799,384

[45] Date of Patent: Jan. 24, 1989

[54] BOOTIE TESTING MACHINE

[76] Inventor: Gianpaolo Casali, via Galvani 6, Arbizzano-Verona, Italy, 37020

[21] Appl. No.: 17,832

[22] Filed: Feb. 24, 1987

[30] Foreign Application Priority Data

Dec. 1, 1986 [DE] Fed. Rep. of Germany ... 8632341[U]

[51] Int. Cl.[4] ............................................. G01M 3/06
[52] U.S. Cl. ..................................................... 73/45.5
[58] Field of Search ......................................... 73/45.5

[56] References Cited

U.S. PATENT DOCUMENTS 2,054,204 9/1936 McDonald ............................ 73/45.5
3,166,439 1/1965 Dennhofer ........................ 73/45.5 X

FOREIGN PATENT DOCUMENTS 943757 12/1963 United Kingdom ................. 73/45.5

Primary Examiner—Stewart J. Levy
Assistant Examiner—Joseph W. Roskos
Attorney, Agent, or Firm—Dena Meyer

[57] ABSTRACT

Apparatus and a method for testing leaks in the footwear articles are provided. Bootie and sock inserts for shoes made of waterproof materials in which the seams are seam-sealed have become popular among people who are involved in sports and other outdoor activities. Many of these products are sufficiently waterproof so that guarantees are made as to their waterproofness. A method for testing and apparatus for testing has been developed which can perform tests on multiple footwear articles simultaneously and produce immediate and reliable results within a matter of minutes. Footwear articles may include bootie inserts, socks, or shoes.

10 Claims, 2 Drawing Sheets

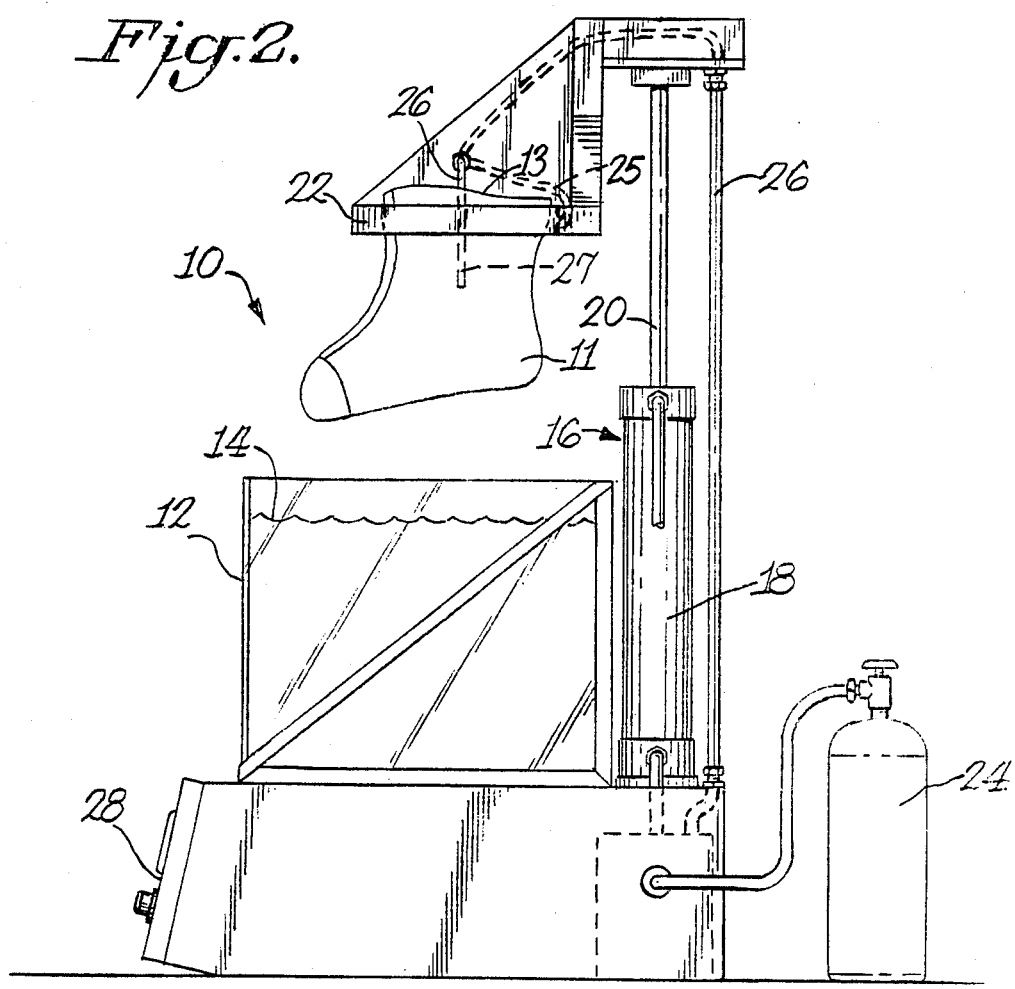
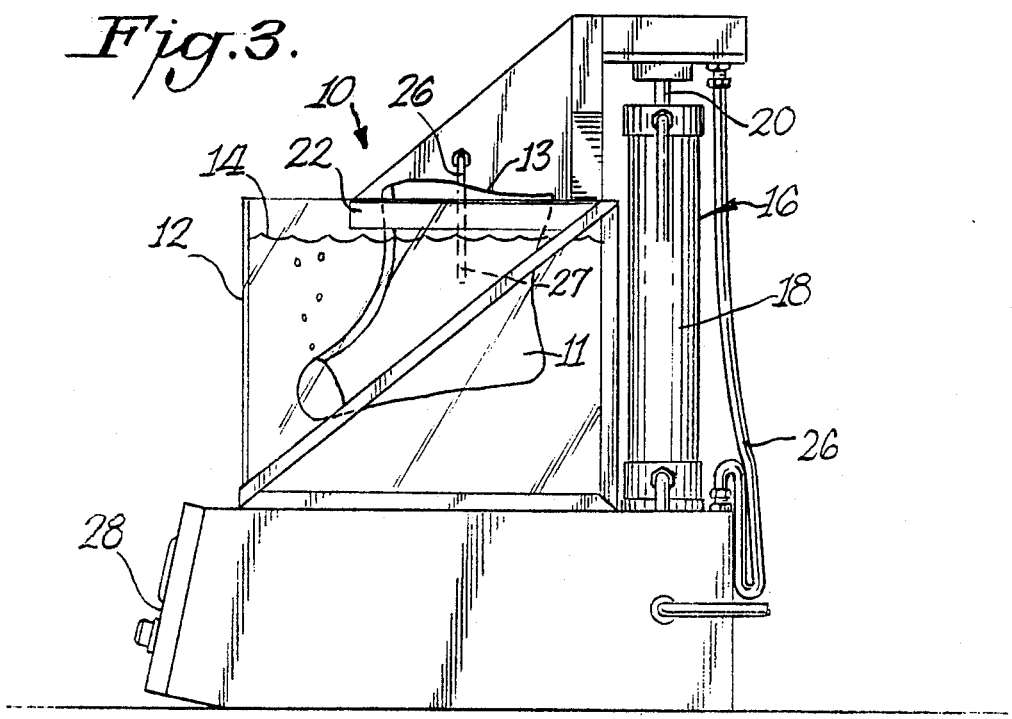

BOOTIE TESTING MACHINE

BACKGROUND OF THE INVENTION

This relates to apparatus for testing and a method of testing the waterproofness of booties and shoes with sock inserts made of waterproof materials.

Booties and sock inserts for shoes made of waterproof materials in which the seams are seam sealed have become popular among many people who are involved in sports and outdoor activities. Many of these products are sufficiently waterproof so that manufacturers offer guarantees to the end users as to their waterproofness and water impermeability.

Traditionally, manufacturers of these waterproof footwear products use time-consuming methods to test the waterproofness of these products. Generally, these methods would require filling a number of pairs of footwear with water and placing them on a dry surface for long periods of time. If there were any gaps in the material or seams, the water would leak out onto the dry surface. One would periodically check the surface to see if there were any leaks. Typically, a manufacturer could not test and get results on more than five to ten pairs of footwear a day.

Although there have been devices made for testing leaks in other articles such as surgical gloves and tires, development has not occurred in testing the waterproofness of footwear products.

U.S. Pat. No. 2,054,204 to McDonald describes a glove testing device. This device is designed to detect holes and needle pricks in surgical gloves. This device requires a glove holder for extension into the wrist end, a clamping mechanism for the wrist, and a vertical adjustable structure. A gas supplying means is also provided to inflate the glove and a bulge preventing element is attached to the holder. The combination is submerged in a body of water to test for leaks in gloves.

U.S. Pat. No. 3,166,439 to Dunnhofer also describes apparatus for testing the waterproofness of gloves. This apparatus consists of a rack with five fingers outstretched in which an adapter is fitted for different treatment devices such as a water device for washing or a compressed air device for testing.

SUMMARY OF THE INVENTION

An apparatus to test leakage of air within a footwear article is provided comprising a receptacle for containing liquid into which the footwear article to be tested is immersed, means for gripping the article in place so that air may be introduced into the opening of the footwear article by a conduit in such a manner that air cannot escape, and means for raising and lowering the footwear article into said receptacle for testing. The means for gripping may be inflatable grippers or may be in the shape of pliers or a clamp. The conduit for supplying compressed air may consist of a tube, preferably copper, attached to a source of compressed air. The means for raising and lowering the footwear article is attached to the means for gripping the footwear article and may be comprised of a pneumatic cylinder.

The method for testing a footwear article for leakage is also provided.

BRIEF DESCRIPTION OF THE DRAWINGS

FIG. 2 is a right side elevational view of the bootie testing machine shown in FIG. 1.

FIG. 3 is a right side elevational view of the bootie testing machine shown in FIG. 2 with bootie submerged in receptacle.

DETAILED DESCRIPTION OF THE INVENTION AND PREFERRED EMBODIMENTS WITH REFERENCE TO THE DRAWINGS

Apparatus and a method for testing leaks in footwear articles are provided. Booties and sock inserts for shoes made of waterproof materials in which the seams are seam-sealed have become popular among people who are involved in sports and other outdoor activities. Many of these products are sufficiently waterproof so that guarantees are made as to their waterproofness. A method for testing and apparatus for testing has been developed which can perform tests on multiple footwear articles simultaneously and produce immediate and reliable results within a matter of minutes. Footwear articles may include bootie inserts, socks, or shoes.

Figure 1:
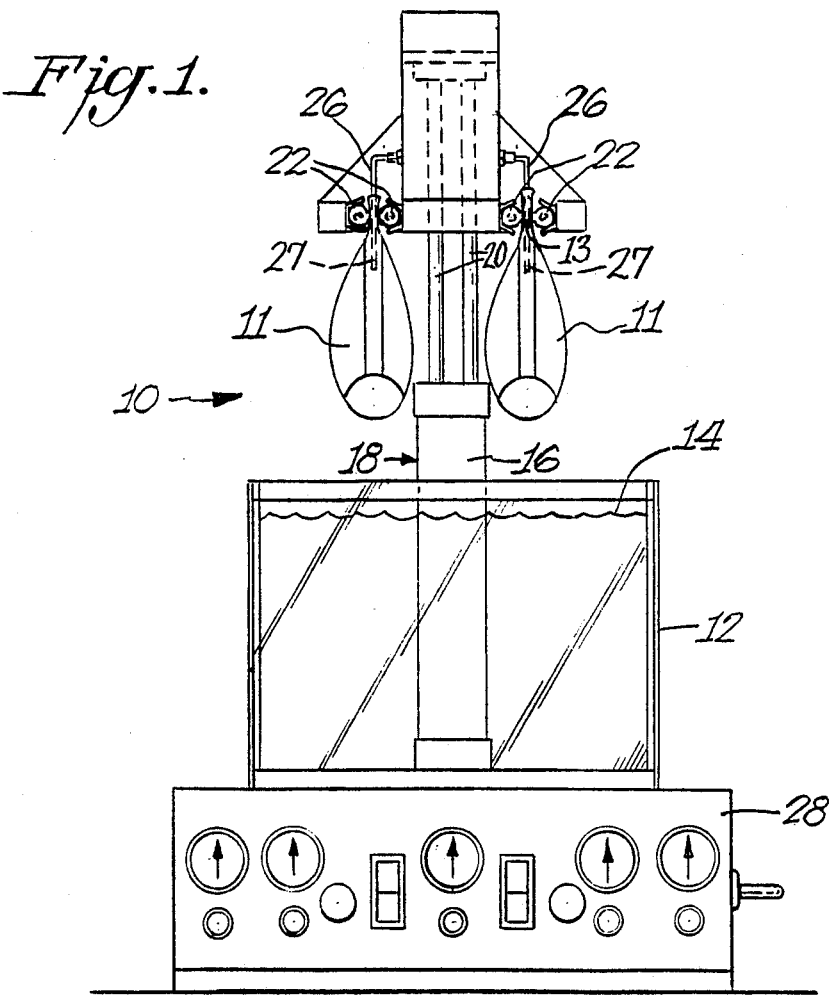
FIG. 1 is a front elevational view of a bootie testing machine.

A detailed description of the invention is best provided with reference to the drawings wherein FIG. 1 is a front elevational view of a bootie testing machine of the invention.

The apparatus includes an open top receptacle 12 for containing a body of water 14 into which the footwear articles 11 are to be submerged during the testing operation. One end of receptacle 12 is laterally extended so that an air inflated footwear article can fit within the receptacle 12 without crimping. The height of the receptacle 12 is sufficient so that the water level 14 in the receptacle is approximately level to the upper edge of the footwear article. The receptacle 12 should have at least one transparent side so that if the footwear article leaks, air bubbles can be easily detected. A fifteen gallon clear Lexan ® tank is an example of a preferable receptacle. Lexan is a trademark for a polycarbonate resin used in molded products as a substitute for glass manufactured by General Electric Co.

Immediately adjacent to the water receptacle 12 is the means 16 for lowering and raising the air-filled footwear article 11, into the water receptacle. The preferred embodiment includes the means for raising and lowering the footwear article to be a pair of pneumatic pistons 20 and cylinder 18 that is vertically disposed adjacent to the water receptacle 12. Cylinder 18 has two elongated pistons 20 that lower and raise footwear article 20 into the receptacle 12 for testing. The height of the cylinder 18 should be slightly larger than the height of the water receptacle 12. The piston 20 should be approximately the same height as the cylinder 18 so that when the piston 20 is fully extended the footwear article is well above the water receptacle. Similarly, as shown in FIG. 3, when the pistons 20 are lowered into the cylinder 18, the footwear article 11 is simultaneously lowered into the water receptacle 12.

At the upper end of the pistons 20 of the piston and cylinder arrangement and extending outwardly over the water receptacle 12 is the means 22 for gripping the footwear article 11. In FIG. 1, there are two pairs of means for gripping 22, however, the apparatus may be designed to have only one pair of gripping means. The means for gripping 22 should be able to seal the upper opening 13 of the footwear article in such a manner that when the article is being filled with air no air can escape. Several means are available that can grip and seal the footwear article. These include clamps, inflatable grippers, and opposing pistons that when activated come together to grip the article. The preferred embodiment includes inflatable gaskets such as Pneuma-Seal ® inflatable grippers available from Prespray Corporation. These grippers 22 comprise rubber grippers that inflate and extend outwardly when air is introduced into the core of the gripper. The alternate embodiments such as clamps or pliers should be provided with rubber or pliable materials so that when engaged to seal the footwear article, they do not cut off the air flow through the conduit 26 used to fill the footwear article.

A supply of compressed air 24 is provided to a gas distribution manifold 28 of the bootie testing machine which is then distributed for raising the pneumatic pistons and cylinder, inflating the means for gripping 22, as well as inflating the footwear article 11 to be tested. A conduit 26 to fill the footwear article with air is also provided. This conduit 26 may consist of a small copper tube. As shown in FIG. 1, the end of the tube 27 should fit within the opening 13 of the upper portion of the footwear article 11 and together with the means for gripping 22 provide a complete seal so that no air can escape from the opening 13 of the upper portion of the footwear article 11. The conduit 26 and end of the tube 27 may be constructed of a noncopper material so long as it does not collapse from the pressure of the means for gripping 22 or constrict air flow into the footwear article 11.

Figure 4:
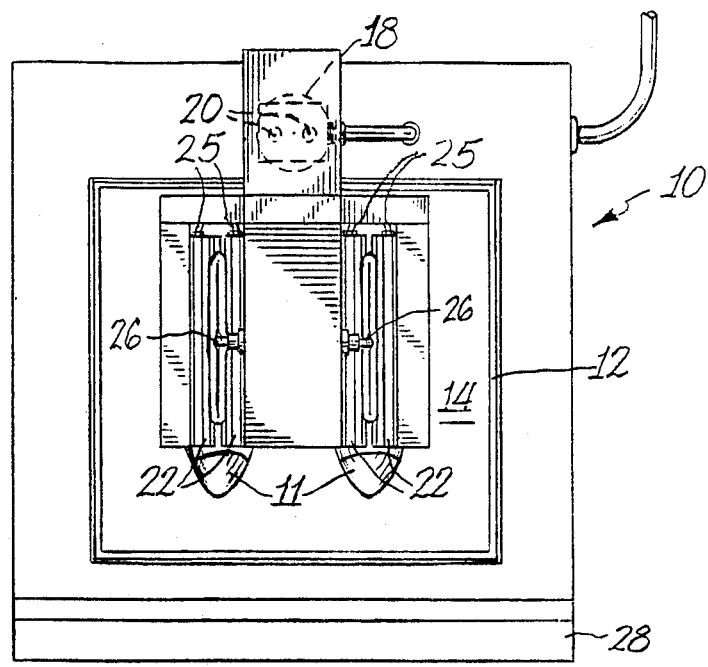
FIG. 4 is a top plan view of the bootie testing machine shown in FIGS. 1-3.

As shown in FIGS. 2 and 4, inflation lines 25 are provided from the conduit 26 and directed to the inflatable grippers 22 to inflate them and thereby grip the footwear articles. The conduit 26 also provides air to the inflation lines 25 that inflate the grippers.

Specific steps in using the bootie testing machine may be carried out by activating the control panel 28.

To test the waterproofness of a footwear article with the bootie testing machine, the footwear article 11 is first inserted between the means for gripping 22 with the conduit 26 that supplies air located within the opening 13 of the upper portion of the article 11. The end 27 of the conduit 26 should be located within the article several inches from the upper edge 13. The means for gripping 22 are then activated so that the grippers inflate thus causing in combination with the conduit 26 a seal in the upper portion of the article so that no air can escape from the upper. The machine is then activated so that air is introduced into the footwear article. The air pressure required to inflate the bootie for testing is between about 0.25 and 7 psi but may increase up to about 25 psi. The air pressure required to test a standard shoe may be greater than 25 psi based on the shoe construction.

The means 16 for lowering the air-inflated footwear article is then activated so that the article is lowered into the water receptacle 12 and submerged below the water level 14. The approximate time required to test booties 11 while submerged in the water receptacle 12 is between about five and ten seconds. The time required to test a shoe for leaks is longer and may range from about twenty to thirty seconds.

To determine whether the footwear article leaks, the operator of the apparatus must observe the water receptacle and watch to see if any air bubbles generated from the footwear article rise to the surface of the water level 14. If no air bubbles are observed within the above mentioned time limits, the footwear article passes the waterproofness test. If air bubbles in the footwear article appear, the article is dried and repaired. The repaired article is then retested.

While the invention has been disclosed herein, in connection with certain embodiments and detailed descriptions, it will be clear to one skilled in the art that modifications or variations of such detail can be made without deviating from the gist of the invention and such modifications or variations are considered to be within the scope of the claims herein below.

I claim:

1. Testing apparatus for detecting the leakage of air from an article of footwear comprising:
   (a) a receptacle for containing liquid into which a footwear article to be tested is immersed;
   (b) means for gripping the footwear article so that air introduced through a conduit into the opening of the footwear article and inflate the article without restraint whereby the means for gripping and conduit together provide a complete seal so that no air can escape, and;
   (c) a means to raise and lower the footwear article into said receptacle for testing.

2. Testing apparatus as described in claim 1 in which the means for gripping the footwear article are in the shape of pliers.

3. Testing apparatus as described in claim 1 in which the means for gripping the footwear article is a clamp.

4. Testing apparatus as described in claim 1 in which the means for gripping the footwear article are inflatable grippers.

5. Testing apparatus as described in claim 1 in which the conduit through which air is introduced by an air distribution manifold into the footwear article is a copper tube attached to a compressed air source.

6. Testing apparatus as described in claim 1 in which the means for raising and lowering said means for gripping the footwear article is a pneumatic cylinder.

7. Testing apparatus as described in claim 1 wherein more than one footwear articles may be tested in sequence.

8. The method of testing leakage of footwear articles comprising gripping the footwear article in place, filling the footwear with air to pressurize the inside of the article without restraint, sealing said article, submerging the footwear article into a receptacle of water and observing bubbles in the water as an indication of leakage.

9. The method as described in claim 8, wherein said footwear article is a bootie and air pressure to fill said bootie is in the range between about 0.25 psi and about 7 psi.

10. The method as described in claim 8 wherein said footwear article is a bootie and the air pressure to fill said bootie is about 25 psi.

* * * * *